United States Patent
Creedon et al.

(10) Patent No.: US 6,385,669 B1
(45) Date of Patent: May 7, 2002

(54) METHOD AND APPARATUS FOR THE DETECTION OF THE PRESENCE OF A DEVICE ON A HIGH SPEED DIGITAL DATA BUS

(75) Inventors: Tadhg Creedon, Furbo (IE); David J Law, Kempston (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/383,929

(22) Filed: Aug. 26, 1999

(30) Foreign Application Priority Data

May 11, 1999 (GB) .............................................. 9910760

(51) Int. Cl.$^7$ ................................................. G06F 3/00
(52) U.S. Cl. ............................... 710/19; 710/1; 710/61; 713/400; 713/600; 370/445
(58) Field of Search ............................... 710/1, 5, 8, 11, 710/15, 19, 17, 25, 38, 58, 62, 61, 117; 713/400, 500, 600; 709/232; 370/445, 433

(56) References Cited

U.S. PATENT DOCUMENTS

| | | | | |
|---|---|---|---|---|
| 4,922,461 A | * | 5/1990 | Hayakawa et al. | .... 365/230.08 |
| 5,347,515 A | | 9/1994 | Marino | |
| 5,809,026 A | * | 9/1998 | Wong et al. | ................. 370/445 |
| 5,907,553 A | * | 5/1999 | Kelly et al. | ................... 370/433 |
| 5,923,663 A | * | 7/1999 | Bontemps et al. | ........... 370/445 |
| 6,215,340 B1 | * | 4/2001 | Nomura | ........................ 327/112 |
| 6,243,756 B1 | * | 6/2001 | Whitmire et al. | ............ 709/232 |
| 6,288,858 B1 | * | 9/2001 | Arnett et al. | ................... 360/45 |

FOREIGN PATENT DOCUMENTS

EP          0175170 A2     3/1986

* cited by examiner

*Primary Examiner*—Jeffrey Gaffin
*Assistant Examiner*—Rijue Mai
(74) *Attorney, Agent, or Firm*—Nixon & Vanderhye P.C.

(57) ABSTRACT

An interface comprises a management entity including a first state machine, a bidirectional serial data bus and a clock line, intended for connection to physical layer devices each of which includes at least one register into which data can be written by way of the serial data bus and at least one register from which data can be read by way of the serial data bus, the management entity providing a clock signal having transitions defining bit periods for said data and further comprising a line driver for the serial data bus and an amplifier which is connected to sense the voltage level of the data bus. The management entity is organised to detect during a specified period while the line driver is quiescent whether the physical layer device is present or not according as the voltage of the bus approaches that of a voltage supply rail in the physical layer device or that of a datum for the management entity. The management entity is arranged to cause the line driver to drive the bus towards the voltage of the supply rail in an interval between the penultimate clock transition before the beginning of said time period and the clock transition denoting the beginning of said time period. The said interval may occur during a reading cycle of the management entity and, in accordance with IEEE Standard 802.3 Clause 22, the reading cycle may be defined to include an address word identifying a register in a physical layer device and a turn around time before the physical layer device provides data and wherein said interval occurs after the provision of a final bit in said address word when the final bit is such as to drive the bus toward the datum.

4 Claims, 3 Drawing Sheets

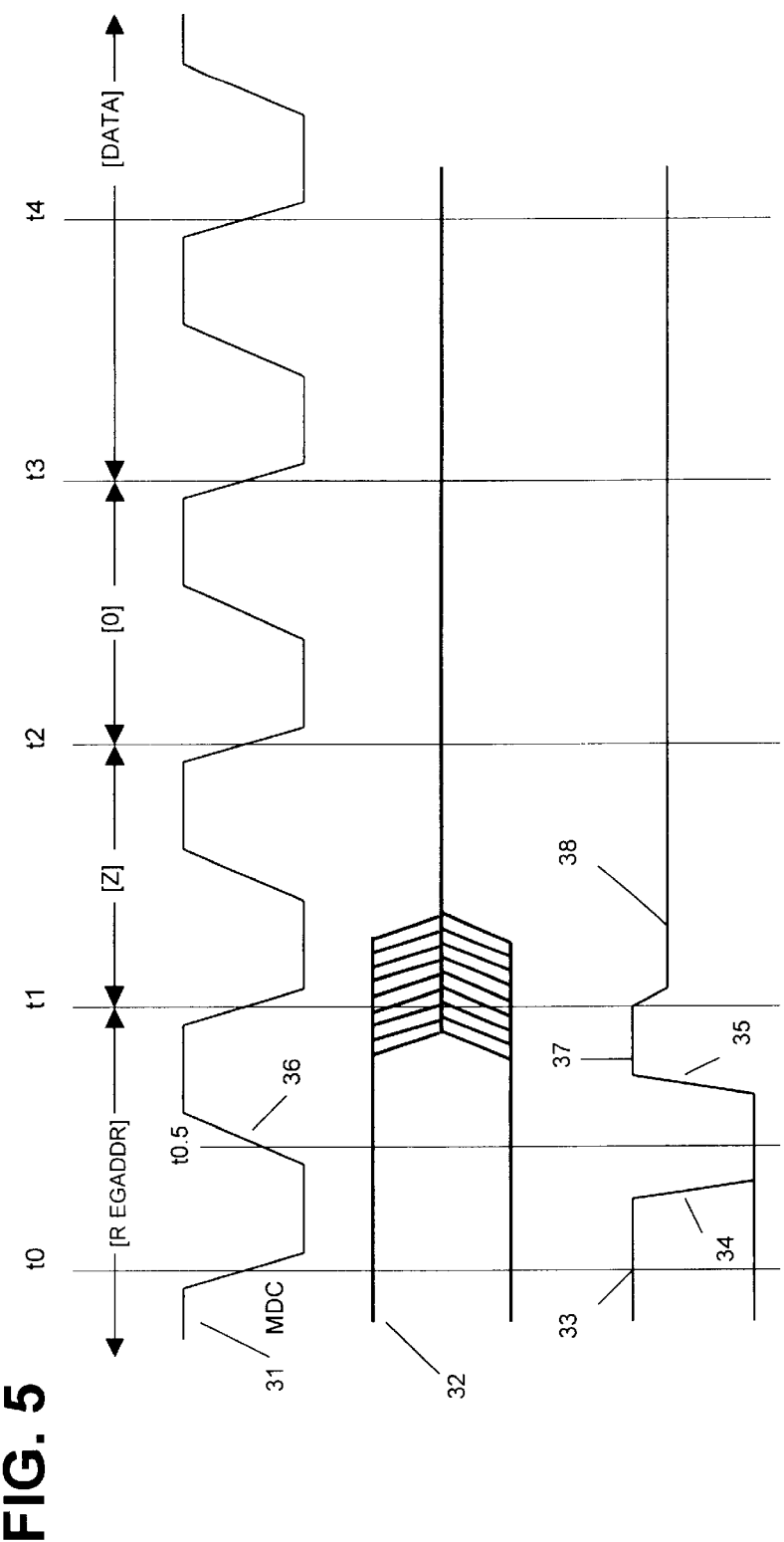

METHOD AND APPARATUS FOR THE DETECTION OF THE PRESENCE OF A DEVICE ON A HIGH SPEED DIGITAL DATA BUS

FIELD OF THE INVENTION

The present invention relates to the detection of the presence of a device on a high speed serial data bus and in particular the detection of a 'physical layer device' on a serial management interface bus driven by a station management entity in a manner conforming to the operational standard, IEEE 802.3 relating to ethernet networks. One object of the invention is to provide for improved detection of a physical layer device while conforming to that standard and particularly clause 22 thereof but the invention is not necessarily limited to that context. In particular it may be suitable for operating a similar interface at higher rates.

BACKGROUND TO THE INVENTION

As will be explained in more detail with specific reference to the aforementioned standard, a preferred and exemplary form of the invention provides for the detection of the presence of a physical layer device which can accept serial data from and provide serial data to a station management entity with which it constitutes a media independent interface within the general 'physical' layer (according to the OSI reference model) between a transmission medium for the conveyance of signals defining frames or packets and the data link or media access control layer of a network device such as, for example, a switch or hub.

A physical layer device of this kind (usually abbreviated to 'PHY') requires management so that a control and monitoring device, otherwise known as the station management entity ('STA') can configure the physical layer device, so far as may be necessary or possible, to determine the operational state or mode for the physical layer device. This is achieved according to the aforementioned standard by, as will be more fully explained below, the use of registers within a state machine of the physical layer device, the registers including at least one control register into which the station management entity may write and at least one status register from which data may be read back to the station management entity. As their names imply, the control register is employed for setting or altering the operational state or mode of the physical layer device whereas the status register indicates the actual operational state or mode. The control register determines, for example, whether the physical layer device is in normal operation or should be reset, whether or not it is in loop-back mode, what its operational speed may be, whether auto-negotiation is enabled, whether it is to operate in full duplex or half duplex mode so on. The status register generally indicates whether the physical layer device is able to perform in specified transmission modes (such as half duplex or full duplex), and at which speeds and indicates other modal characteristics not primarily relevant to the present invention.

In the case of a multi-port network device it is customary to provide for management of a multiplicity of such physical layer devices by a common station management entity and, will be indicated, the management control by that entity is exercised by the transmission of defined serial data words which include data fields for addressing the individual physical layer devices and specific registers within them as well as determining whether a write operation or a read operation is to be performed. The Media Independent Interface (MII) Management Interface conforms to various requirements set out in the mu aforementioned standard and, at the present time, is intended to be capable of accommodating up to thirty-two physical layer devices with a single station management entity, subject to certain restrictions not relevant to the present invention. Physically the management is exercised by means of data conveyed over a serial bus through the MII Management Interface to the physical layer devices, the bus normally being termed the management data input/output (MDIO) bus. Another line conveys a clock signal, the management data clock (MDC), since it is necessary that the management data be properly synchronized to that clock. A station management entity and a physical layer device each have state machines which provide information to a respective line driver coupled to the MDIO bus and receive data from the bus by way of a buffer amplifier. How the signals are generated and the particular internal workings of the state machines are not fundamental to the present invention, the aforementioned standard specifies in some detail the physical constraints on the signals to be employed.

One function which is desirable to perform is the detection of whether a particular physical layer device is actually coupled to the bus. It is desirable to allow products having for example different numbers of ports (and therefore different numbers of PHYs) to have the same design of STA and the same software. It is accordingly desirable to be able to determine whether particular PHYs are fitted or not. It is also desirable to be able to detect the 'hot' removal of a device from the system and to detect modules that may or may not be present.

The signal sent to a physical layer device by the management entity, usually termed 'frame' has a defined format and is required to be placed on and read from the data bus by means of tri-state devices. More particularly, the frame format includes after the data field defining the address data, a 'turnaround' portion, constituted by two bit times in the standard. During a read transaction the first bit time is provided to ensure that there is no contention with other signals during the change over from the STA's driving of the line to the PHY's driving of the line. The second bit time is provided to indicate a response by an addressed device. The defined states of the station management entity and the physical layer device during the turnaround time are such as to enable the station management entity to determine whether the addressed physical layer device is present by monitoring the potential of the data bus during that time. The use of the aforementioned standard for 'multi-drop' busses requires a resistive pull-up for the data bus, normally implemented by a 1.5 kilohm resistor between the bus and the positive rail (at 5 volts). This necessary feature will provide that if during a 'read' access an addressed PHY is present, and responds, the line will be 'low' during the second turn-around bit, whereas if there is no device at the PHY address which is accessed, the line will float 'high'. The voltage level of the bus can be monitored by way of the input buffer of the station management entity, so as to perform a comparison of the voltage level of the bus with a reference and to provide an indication whether the physical layer device is present or not.

Since however the pull-up resistor is associated with stray capacitance, there is in a variety of circumstances a delay, determined by the time constant of the circuit branch including the resistor, before the voltage level reaches a substantially steady state which gives a reliable indication whether the addressed physical layer device is present or not. Accordingly, as operational speeds increase, such a method of monitoring the voltage level of the MDIO becomes less reliable.

It is as indicated in the foregoing, generally the object of the invention to relieve this difficulty primarily in the circumstances of a station management entity and a physical layer device in communication according to the IEEE standard 802.3, clause 22, but in analogous circumstances the invention may have a more general utility.

In essence, the invention relies on the fact that the "set up and hold" times for the data are quite narrowly defined relative to the clock and there is accordingly sufficient time, particularly after the last possible clock transition relative to the last address bit before the turnaround time, to drive the management data input/output bus high if necessary. This ensures that the time constant associated with the pull-up resistor is no longer a limitation on the speed of operation and therefore facilitates the detection of the presence of a physical layer device operational at higher data rates than would otherwise be feasible.

The foregoing and other features of the invention will be further explained with reference to a specific example and the accompanying drawings.

BRIEF DESCRIPTION OF THE DRAWINGS

FIG. 4 illustrates a management frame.

FIG. 5 is a diagram illustrating the relative timing of various signals in the system shown in FIG. 2.

DETAILED DESCRIPTION OF THE PREFERRED EMBODIMENT

Figure 1:
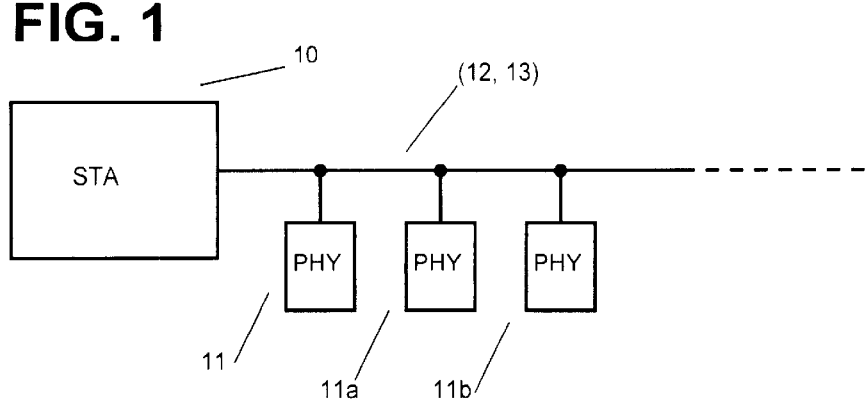
FIG. 1 is a general illustration of a station management entity and a multiplicity of physical layer devices in communication by way of a MII Management Interface.

The described embodiment of the present invention is intended for use in a system as shown in FIG. 1 wherein a station management entity 10 is coupled to configure any of a multiplicity of addressable physical layer devices (PHYs) 11, 11a, 11b etc by way of a management interface (12, 13) to which the devices 11, 11a, 11b etc are appended. The relationship of the entity 10 to each of the devices is similar and therefore only one of the addressable devices (11) is shown in the more detailed diagram constituting FIG. 2.

Figure 2:
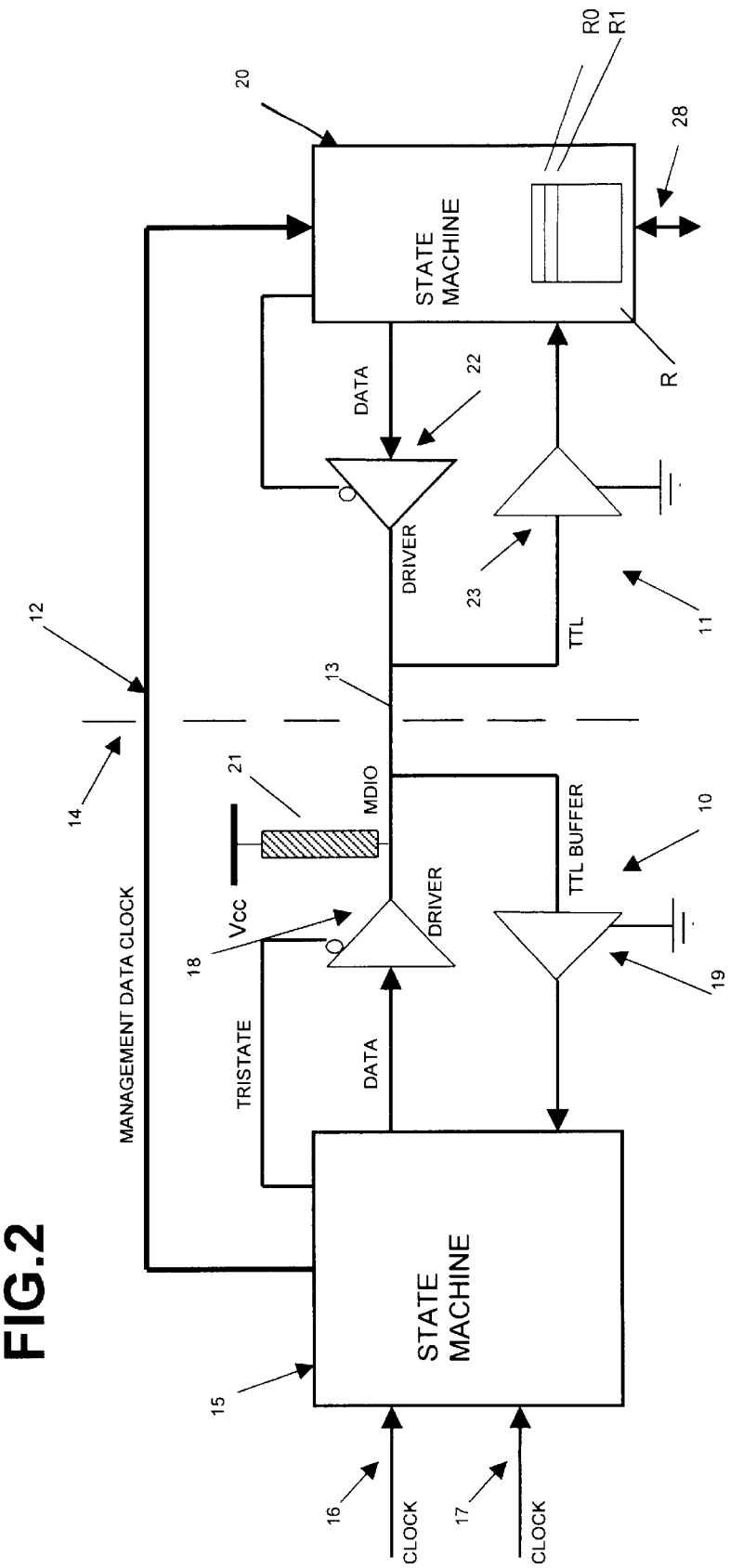
FIG. 2 is an illustration of part of the interconnection of a station management entity and one of the physical layer devices.

FIG. 2 illustrates therefore the relevant parts of a system of a station management entity 10 and a physical layer device 11 so far as concerns the exchange of management information between the entity 10 and the device 11. It will be understood that the main function of the physical layer device 11 is to provide for translation of signals between a transmission medium (normally by way of a media dependent interface) and a media access control layer or repeater in accordance with IEEE standard 802.3. This aspect of the physical layer device is not directly relevant to the invention and is briefly indicated in FIG. 3. In essence, the management interface, as defined in the standard, is a two wire serial interface constituted by a wire 12 and a wire 13, to enable the entity 10 to control the physical layer device 11 and to obtain status information from it. The division between the entity 10 and the device 11 is denoted in FIG. 2 by the chain line 14.

The management entity includes a state machine 15 which receives on line 16 a clock signal determining the 'management data clock' which is conveyed on line 12 to the physical layer device 11. As will be appreciated from further description below, the state machine also receives a clock signal which is at a frequency which is higher than but harmonically related frequency to that of the clock signal on line 16. In practice the clock signal on line 16 may be a divided down (e.g. by 15) version of the clock signal on line The state machine 15 provides a serial data signal in a specified frame format to a line driver 18 of which the output is coupled to the management data input/output bus line 13. This line is used for both conveying frames to the physical layer device 11 and for receiving data back from the device 11. For the latter purpose, the line 13 is coupled to the input of a buffer amplifier 19, normally a TTL amplifier of which the output is coupled to the state machine 15. Among other things, the state machine is capable, in a manner known in itself, of decoding the data received from the line 13 and also, at controlled times, to determine the voltage level of the line 13.

The line driver 18 is specified to be a tri-state driver, that is to say it may place either a "1" or "high" signal on line 13, a "zero" or "low" signal on line 13 or provide a high impedance (Z) state for line 13.

Likewise, the physical layer device 11 may provide data to a line driver 22 coupled to the line 13. It includes a TTL buffer amplifier 23 receiving data from the line 13. The physical layer device 11 includes a state machine 20.

As is specified in much greater detail in the aforementioned standard, the physical layer device includes a set of registers R. This set includes a control register R0 and a status register R1. The various bits in the control register can be set by the management entity and define various operational states such as whether the device is reset or in normal operation, whether it is loop-back mode or not, what operating speed is to be enabled, whether auto-negotiation is to be enabled, whether power down or normal operation is to be enforced, whether operation in half duplex or full duplex mode is required and so on.

The status register R1 is a read only register and defines the actual operational state of the PHY. The various bits define, for example, whether full duplex or half duplex mode is enabled, for which operational condition, and so on.

The line 13 is coupled by way of a pull-up resistor 21 to the relatively positive rail (Vcc).

Figure 3:
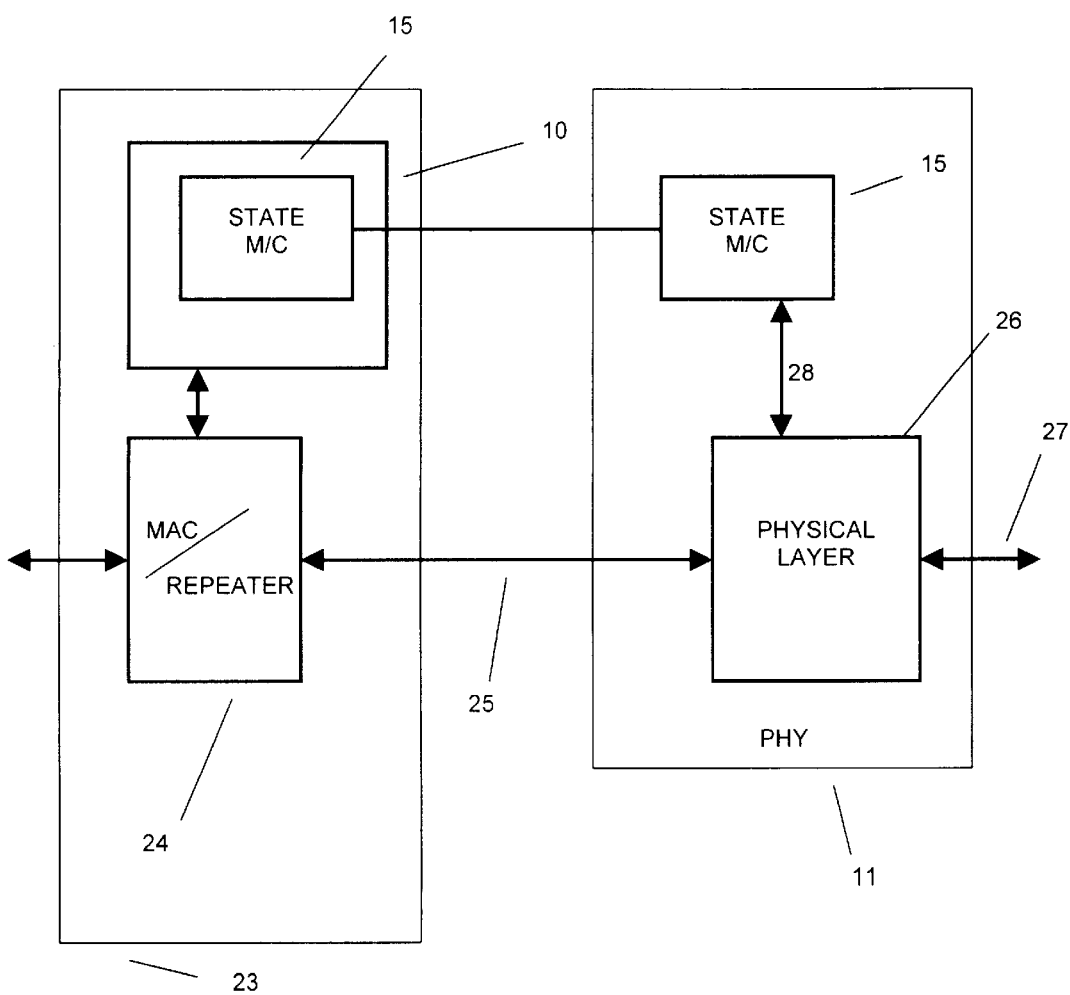
FIG. 3 is another illustration of the station management entity and the device shown in FIG. 2.

Before the operation of the interface is described, reference is made to FIG. 3, which illustrates the state machine 15 within a device 23 which will include the STA 10 and which includes a MAC/repeater 24 (of known construction). The repeater 24 is connected by way of lines 25 with the physical layer 26 which is coupled to the external lines 27 (representing the transmission medium) and, in known manner, serves to convert signals received from lines 27 into signals in a media-independent format for the repeater and vice-versa. The known control of the physical layer 26 by state machine 11 is denoted by lines 28.

The operation of the media independent interface will be described with reference to FIGS. 4 and 5.

FIG. 4 illustrates schematically a management frame which is conveyed as the management data input/output signal when the state machine requires to perform either a write operation or a read operation on the respective register in the device 11. The frame format shown in FIG. 2 begins with a preamble, which in the particular example is a sequence of (thirty-two) consecutive logic 1 bits, along with thirty-two corresponding clock cycles to provide the physical layer device with a pattern that it can use to establish synchronization. This preamble is not absolutely necessary in all circumstances, and in particular the aforementioned standard indicates that if the management entity determines that every physical layer device that is connected to receive the MDIO signal can accept management frames that are not preceded by the preamble pattern, then such a preamble pattern may be omitted.

The next portion of the frame format is a start of frame ST, preferably indicated by a [01] pattern. This section is followed by an operation code OP which is [10] for a read transaction and [01] for a write transaction.

The address data is in two parts. The first part is the address of the particular physical layer device (PHY ADDR) The next section is the address of a register within a physical layer device. Typically the register address (REGADDR) comprises five bits allowing thirty-two individual registers to be addressed within each physical layer device. It is defined in the standard that the R0 register shall have address zero [00000] and the register R1 shall have the address [00001].

The next section of the management frame is the turnaround time TA. This is a two bit time spacing between the register address field and the data field of the frame to avoid contention during a read transaction. The standard defines that for a read transaction, both the station management entity and the physical layer device should remain in a high impedance (Z) state for the first bit time of the turnaround. A physical layer device, if addressed, should drive a zero bit during the second bit time of the turnaround of a read transaction. The standard also defines that during a write transaction, the station management entity must drive a "one" bit for the first bit time of the turnaround time and a zero bit for the second bit time of the turnaround time. The significance is that the register address does not necessarily end in a "1" (high) and the PHY 11 does not always drive the MDIO signal for all the cycle (i.e. during a 'read' operation).

The final section of the management frame is the data section which is customarily sixteen bits.

FIG. 5 illustrates the relative timing of the last part of the register address signal, the turnaround time and the beginning of the data signal.

In FIG. 5, the wave-form 31 represents the clock signal, wave-form 32 represents the last part of the register address signal. As may be seen, the last bit of the register address signal occurs within the cycle from t0 to t1 of the clock signal. It may terminate at some point after the clock signal transition occurring midway in this cycle, as shown by the line at t0.5. The significance of this to the present invention will be discussed below. The turnaround time in this example occurs in the two cycles t1–t2 and t1–t3. The clock cycle between times t3 and t4 is the first data cycle.

Since the management data input/output signal may be quiescent during the turnaround time, the voltage level of the line 13 will then be determined by the presence or absence of the physical layer device 11. Thus, if the device is not present, voltage level of the line rises towards Vcc. If the physical device is present at the accessed address, during this quiescent time the voltage on the line 13 will be driven low.

If the entity is not driving line 13 (as in a read operation) during time t1–2 and the last bit of the register address word is zero (low) the line needs to rise in voltage to at least a positive value some point before the end of the turnaround time so that it can be reliably sampled.

Owing to the inevitable associated capacitance, there is a significant time constant associated with the action of the pull-up resistor. As speeds increase, the substantially irreducible time constant is likely to prevent a reliable determination of the presence of the device within the time available.

The present invention springs from an appreciation that the final data bit in the register address field, while needing to be stable during the clock transition 36, is of no consequence after the permitted limit of variation of the phase of the data signal relative to the clock signal. In other words, the "set up and hold" time is quite narrowly specified and typically the last bit of the register address signal need only be of the required value for ten nano-seconds on each side of the centre point of the transition 36.

This is exploited in the present invention, as indicated by the third graph in FIG. 5, illustrated by the line 33. For this signal, the transition 34 illustrates the latest time for a transition between the penultimate and ultimate bits in the register address signal if they are [1,0] and the transition 35 represents the earliest time at which the MDIO signal can exhibit a transition which will not prejudice the normal address decoding by state machine 20.

It follows that there is a substantial interval between the earliest possible position for transition 35 and the end of the relevant clock cycle (time t1) during which, provided that a higher frequency clock than clock 31 is available, the MDIO signal can be driven high by an appropriate output from state machine 15 to line driver 18. If the MDIO signal is already in the high state because the last bit of the register address is high, then the high state may merely be continued during the interval 37 instead of returning to the quiescent state as shown by signal 32.

Section 38 of line 33 illustrates what happens after the high 37 ceases, as is required by the standard. Although the voltage level of the MDIO signal may fall slightly, it is already in a high state at substantially the beginning of the interval (t2–t3) in which it is to be monitored. Any time constant associated with the charging or discharging of the circuit containing the pull-up resistor is compensated by the earlier start (transition 35) of the high, or eliminated because the high of the MDIO signal is already present.

It will be apparent from the foregoing that although the specific example relates to a narrowly defined standard, the invention is applicable in circumstances where as monitoring period for a bidirectional line occurs in a cycle subsequent to a clock cycle wherein an accompanying data signal can be narrowly defined with a sufficiently short set up and hold time that allows space in the final part of that clock cycle to achieve dynamically the effect of a pull-up resistor for the bi-directional data line.

What is claimed is:

1. An interface comprising a management entity including a first state machine, a bidirectional serial data bus and a clock line, intended for connection to physical layer devices each of which includes at least one register into which data can be written by way of the serial data bus and at least one register from which data can be read by way of the serial data bus, the management entity providing a clock signal having transitions defining bit periods for said data and further comprising a line driver for the serial data bus and an amplifier which is connected to sense the voltage level of the data bus, the management entity being organised to detect during a specified period while the line driver is quiescent whether the physical layer device is present or not according as the voltage of the bus approaches that of a voltage supply rail in the physical layer device or that of a datum for the management entity, the management entity being arranged to cause the line driver to drive the bus towards the voltage of the supply rail in an interval between the penultimate clock transition before the beginning of said time period and the clock transition denoting the beginning of said time period.

2. An interface according to claim 1 wherein the management entity includes a resistive pull-up for said bus.

3. An interface according to claim 1 wherein said interval occurs during a reading cycle of the management entity.

4. An interface according to claim 3 wherein the reading cycle is defined to include an address word identifying a register in a physical layer device and a turn around time before the physical layer device provides data and wherein said interval occurs after the provision of a final bit in said address word when the final bit is such as to drive the bus toward the datum.

* * * * *